United States Patent [19]
Hudson et al.

[11] Patent Number: 5,662,733
[45] Date of Patent: Sep. 2, 1997

[54] VISCOSITY AND GEL STRENGTH OF ORGANIC ADHESIVE COMPOSITIONS BY THE ADDITION OF ACIDIC MATERIALS

[75] Inventors: Alice P. Hudson, Jupiter; James E. Nevin, Boynton Beach, both of Fla.

[73] Assignee: Surface Chemists of Florida Inc., Riviera Beach, Fla.

[21] Appl. No.: 630,160

[22] Filed: Apr. 10, 1996

[51] Int. Cl.$^6$ .................................................. C09J 195/00
[52] U.S. Cl. ........................................ 106/278; 106/281.1
[58] Field of Search ................................ 106/278, 281.1

[56] References Cited

U.S. PATENT DOCUMENTS

| | | | |
|---|---|---|---|
| 4,759,799 | 7/1988 | Vicenzi | 106/281 |
| 5,035,080 | 7/1991 | Gaidis | 106/278 |
| 5,268,029 | 12/1993 | Demangeon et al. | 106/278 |
| 5,529,621 | 6/1996 | Hudson et al. | 106/278 |

OTHER PUBLICATIONS

Product Bulletin: Attagel 36 Asphalt Thickener, Engelhard Corp. Edison, NJ no date avail.

*Primary Examiner*—David Brunsman

[57] ABSTRACT

The viscosity and gel strength of organic adhesive coating compositions containing an organic adhesive material, usually asphalt, and clay minerals and cationic surfactants is further enhanced by the addition of small quantities of acidic compounds which have $pK_A$ values less than about 5. The acidic compounds preferably are water soluble and contain phosphorus.

9 Claims, No Drawings

VISCOSITY AND GEL STRENGTH OF ORGANIC ADHESIVE COMPOSITIONS BY THE ADDITION OF ACIDIC MATERIALS

FIELD OF THE INVENTION

This invention is related generally to an improvement in organic coating compositions which incorporate clays as thickening or gelling agents and require a surfactant to maximize the gelling efficiency of the clays. These compositions are mixtures of a base binder or adhesive, normally asphalt, the clay thickener, and a surfactant. The improvement is an additive which when added at low levels further enhances the efficacy of the clay/surfactant system, and allows the use of lower levels of clay and surfactant. The compositions can also include various fillers and can be used in many applications, including but not limited to roof coatings, paints and automotive underbody coatings.

BACKGROUND OF THE INVENTION

Historically asbestos has been used in asphalt roofing compositions and other organic coating materials for roofing applications, automotive underbody coatings, foundation coatings, mastics and adhesives, and other specialty applications to provide a thixotropic structure that is sag resistant and does not settle in storage. Environmental concerns about asbestos have constrained the industry to seek alternative gelling and viscosifying agents. Clay minerals and particularly attapulgite clay minerals have been shown to be effective and are widely used. The attapulgite clays require the use of cationic surfactants to fully develop the gelling and viscosity properties of the clay. Cationic surfactants which have been used in this application include quaternary ammonium salts such as dicocodimethyl ammonium chloride, tallow trimethyl ammonium chloride, and methyl-1-oleylamidoethyl-2-oleylimidazolinium methyl sulfate. Also used are alkyloxyalkylamine salts such as isodecyloxypropyl ammonium acetate. Our copending application Ser. No. 08/482,483, now U.S. Pat. No. 5,529,621, incorporated herein by reference, discloses surfactants which are organic salts of surface active polyamines and carboxylic acids, wherein the polyamines have the structure:

wherein R is chosen from the group consisting of (i) alkyl or alkenyl containing from about 10 to about 22 carbon atoms, and (ii) R'—O—CH2CH2CH2— wherein R' is alkyl containing from about 8 to about 22 carbon atoms, A is a divalent hydrocarbyl group containing about 2 to about 6 carbon atoms, and n is an integer from about 1 to about 3; and the carboxylic acids have the structure:

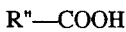

wherein R" is alkyl or alkenyl containing about 6 to about 28 carbon atoms.

To produce asphalt compositions with a gelled consistency for cements or mastics historically requires clay contents of 12 percent by weight or more. For clays to provide the desired thixotropy they must contain about 10 percent by weight water. To meet the requirements of ASTM D-4586, "Standard Specification for Asphalt Roof Cement, Asbestos Free", the final composition must contain less than 3 percent water, and for the maximum moisture insensitivity of the asphalt composition, preferably contains less than 1 percent water. The use of high levels of clay, however, may cause the resulting asphalt composition to contain an undesirable level of water which renders the applied coating moisture sensitive, i.e. susceptible to softening, disintegration, loss of adhesion, or other damaging effects when exposed to environmental moisture. Furthermore, the clay minerals used are hydrophilic independent of their water content, and also contribute to the moisture sensitivity of the asphalt composition.

Clays that are desirable as viscosifying or gelling agents have a small uniform particle size and a large surface area. These clays are more costly than the other components in the asphalt composition, so their use at higher levels increases the cost of the compositions on a weight basis. Further, the clays are more dense than the other components, so their use at higher levels increases the density of the final asphalt composition. Since the final compositions are typically sold by volume rather than by weight, and the clay component is typically sold by weight, the cost of the clay is usually not recovered. The surfactants also are costly components of the asphalt compositions, and reduction in the level of their use also significantly reduces the cost of the asphalt formulation. An economic advantage results if the quality of the final product can be maintained at reduced levels of clay and surfactant.

Thickened asphalt compositions frequently contact metal surfaces in their application as roofing and other construction materials and underbody coatings. It is desirable to protect these metal surfaces from corrosion by the inclusion of a corrosion inhibiting material in the asphalt compositions.

OBJECTS OF THE INVENTION

The principal object of this invention is to provide a method to improve the thixotropic properties of clay-surfactant containing adhesive compositions at lower levels of clay and surfactant, so that they are easily applied, sag resistant, and non-settling.

Another object is to decrease the water sensitivity of the final asphalt composition by decreasing its water and hydrophilic clay content.

Another object is to provide corrosion protection for metal surfaces with which the asphalt may come into contact.

These and other important objects will be apparent from the descriptions of this invention which follow.

SUMMARY OF THE INVENTION

These and other objectives can be accomplished by the provision of compositions comprising an organic adhesive material, usually an asphalt cutback, a clay mineral or mixture of clay minerals, at least one cationic surfactant, and at least one acid with a $pK_A$ value less than about 5;

wherein the clay mineral is present at about 2 to about 33 percent by weight of the weight of the asphalt cutback, the cationic surfactant is present at about 5 to about 33 percent by weight of the clay mineral, and the acid is present at about 5 to about 50 percent by weight of the cationic surfactant.

The addition of the acid substantially improves the thixotropy or gel strength of the asphalt composition, allowing the use of lower levels of clay and surfactant. The preferred phosphorus containing acids provide corrosion protection to metal surfaces in contact with the asphalt composition.

DESCRIPTION OF THE PREFERRED EMBODIMENTS

The compositions of this invention are thickened organic coating products prepared from mixtures of organic binder or adhesive materials, usually asphalt and other bituminous materials, and clay minerals and cationic surfactants which acting together thicken, stabilize and impart thixotropic properties to the composition. The inclusion of low levels of an acidic activator in the mixtures markedly increases the viscosity and gel strength of the compositions. The mixtures contain an organic adhesive material, usually asphalt cutback, a clay mineral, or a mixture of clay minerals, a cationic surfactant or a mixture of cationic surfactants, and an acid with a $pK_A$ value less than about 5, or a mixture of such acids;

wherein the clay mineral is present at about 2 to about 33 percent by weight of the asphalt cutback, the cationic surfactant is present at about 5 to about 33 percent by weight of the clay mineral, and the acid is present at about 5 to about 50 percent by weight of the cationic surfactant. Further, the weight ratio of clay mineral to acid is at least about 5 to 1, and the acid is present at a maximum level of about 1 percent by weight of the final composition. Inert fillers which provide bulking, shrinkage control, reinforcing, and favorably impact the economics of the final compositions may be added to the above composition.

The composition of the organic binder or adhesive material can vary over a wide range. Preferred materials are asphalt cutback compositions, which are mixtures of asphalt and solvent. The asphalts are usually residues from petroleum refining and are mixtures of high molecular weight hydrocarbons with ring and ball softening points of about 55°–75° C. These materials can be air blown at elevated temperatures to increase the molecular weight of the component hydrocarbons and increase the softening points to about 80°–90° C. The solvents are usually petroleum distillate fractions and vary in their degree of volatility. Typically slow cure asphalts contain up to about 50% gas oil, medium cure asphalts contain about 15–45% kerosene, and fast cure asphalts contain about 15–45% naphtha. Examples of suitable asphalt cutbacks for use in this invention are Tropical cutback from Tropical Asphalt Products Corporation in Hallandale, Fla.; Seaboard asphalt cutback from Seaboard Asphalt Products Company, Baltimore, Md.; Brewer asphalt from the Brewer Company, Milford, Ohio; Monsey asphalt cutback from Monsey Products Corporation, Kimberton, Pa.; an asphalt cutback from Gardner Asphalt Company, Tampa, Fla.; and the Trumbull cutbacks numbers 6032, 6036, and 6052 from Trambull Asphalt, Summit, Ill.

A variety of clay minerals can be used in this invention. Preferred clays are of the attapulgite type which are mined from deposits in the vicinity of Attapulgus, Ga. These clays are specifically sized after the mining process to provide a small uniform particle size with a large surface area, which maximizes their efficacy to provide improved viscosity and/or thixotropy. Other clays such as the bentonite type may also be used with good results. Sepiolites may also be used. Kaolinites are less preferred.

Examples of suitable clays include Attagel 20, Attagel 36, and Attagel 40, which are attapulgite clays available from Engelhard Corporation, Edison, N.J.; Min-U-Gel AR, Min-U-Gel PC, and Min-U-Gel FG, which are attapulgite clays available from Floridin Company, Berkeley Springs, W. Va.; Gel 601P, which is an attapulgite clay available from Milwhite, Inc.; Houston, Tex., and Pangel FF which is a sepiolite clay from TOLSA, Madrid, Spain.

Cationic surfactants which are capable of increasing the viscosity and/or gel strength of asphalt compositions containing attapulgite or other gelling clays in asphalt compositions are suitable. Preferred surfactants are disclosed in our copending application Ser. No. 08/482,483, now U.S. Pat. No. 5,527,621, incorporated herein by reference, which are the salts of surface active polyamines and carboxylic acids, wherein the polyamines have the structure:

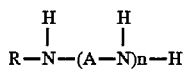

wherein R is chosen from the group consisting of (i) alkyl or alkenyl containing from about 10 to about 22 carbon atoms, and (ii) R'—O—CH2CH2CH2— wherein R' is alkyl containing from about 8 to about 22 carbon atoms, A is a divalent hydrocarbyl group containing about 2 to about 6 carbon atoms, and n is an integer from about 1 to about 3; and the carboxylic acids have the structure:

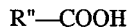

wherein R" is alkyl or alkenyl containing about 6 to about 28 carbon atoms. Other suitable surfactants are dicocodimethyl ammonium chloride, sold by AKZO NOBEL, Chicago, Ill., as Arquad 2C-75 and by Witco Corp., Memphis, Tenn., as Adogen 462; di-(hydrogenated tallow) dimethyl ammonium chloride, sold by AKZO NOBEL as Arquad 2HT; tallow trimethyl ammonium chloride available as Arquad T-50 from AKZO NOBEL, oleyl hydroxyethyl imidazoline acetate, available as Varine O Acetate from Witco Corporation, Memphis, Tenn.; isodecyloxypropyl amine acetate, available as PA-14 Acetate from Tomah Products, Milton, Wis.; and Redicote CG and Redicote I-1400 which are proprietary cationic surfactants from AKZO NOBEL.

The acid materials are chosen from those which have $pK_A$ values less than about 5. Preferred acids are water soluble and capable of forming a passivating film on metal surfaces, particularly ferrous metal surfaces. Preferred acids have equivalent weights per acid functional group of less than about 200. More preferred acids contain phosphorus. Included are polyphosphoric acid, organic phosphate esters, phosphonic acids, and ortho phosphoric acid. Most preferred acids are polyfunctional. Examples of polyfunctional phosphorus containing acids include phosphate esters of polyhydric alcohols such as polyalkylene glycols, glycerine, and sorbitol, phosphonic acids such as (1-hydroxy-ethylidene) diphosphonic acid, and amino-tris(methylene-phosphonic acid). Acids containing phosphorus have corrosion inhibiting properties on metal surfaces.

Other suitable acids include mineral acids such as sulfuric acid and phosphoric acid, water soluble organic acids such as oxalic acid, citric acid, glycolic acid, acetic acid, and gluconic acid, and polymeric acids such as polyacrylic and polymaleic acid, and acrylic acid and maleic acid copolymers. Mixtures of acids are suitable. The acids can be added as 100 percent active materials or as water solutions. It is preferred to dissolve solid materials in water to improve the dispersion in the composition.

The ratios of the components depend upon the desired physical properties of the final product, and on experimentally determined interactions among the components which maximize the viscosity or gel strength of the final compositions. The weight ratio of asphalt cutback to clay depends upon the viscosity or gel strength desired and the particular clay and asphalt cutback used. It is typically between about 50 to 1 and 3 to 1, and preferred ratios are between about 20 to 1 and 4 to 1. As the weight ratio of clay to surfactant (the C/S ratio) is varied the gel strength of thixotropy typically goes through a maximum and this ratio is advantageously chosen. This ratio is typically between about 20 to 1 and about 3 to 1, and is preferably between about 12 to 1 and 4 to 1. Varying the weight ratio of surfactant to acid activator also usually causes the gel strength to go through a maximum, and this ratio is advantageously chosen. This ratio is typically between about 20 to 1 and 2 to 1, and is preferably between about 10 to 1 and 3 to 1. Further, the ratio of clay mineral to acid is at least about 5 to 1, and the acid is present at maximum level of about 1 percent by weight of the final composition.

Such compositions may also contain fillers which provide bulking, reinforcing, shrinkage control, and favorably impact the economics of the final compositions. The type and amount of fillers will affect the texture and viscosity of the asphalt coating composition and the use of fillers will be dictated by the properties needed in the intended application of the asphalt composition. Examples of suitable fillers include cellulosic and synthetic fibers, sand, limestone, ground slate, fly ash, and diatomaceous earth. The fillers can be added at levels up to about 50 percent by weight of the final composition.

Another aspect of the invention is to a method for preparing asphalt compositions and other organic adhesive or coating materials which comprises the steps of 1. providing a quantity of organic binding or adhesive material, which is preferably an asphalt cutback,
2. adding a cationic surfactant and mixing,
3. adding a clay mineral and mixing,
4. optionally adding an additional quantity of organic adhesive material and mixing,
5. adding an acid with a $pK_A$ value less than about 5, and mixing.

The temperature at which the process is carried out is not critical. It must be high enough that the asphalt cutback is adequately fluid to allow mixing of the components. Typically the asphalt cutback is supplied at temperatures up to about 60° C. and the mixing is done at this temperature. Any mixing equipment commonly used in the industry is suitable. If the mixer provides low shear, a pre-gelling procedure in which the surfactant and the clay is first mixed with a portion of the asphalt cutback, typically 50 to 75 percent of the total, is preferred. The remainder of the asphalt cutback is added after the clay is mixed into the pre-gel. The acid is preferably added after all of the cutback is added. Fillers and other adjuvants are typically added last. If high shear mixing is provided a pre-gelling procedure is not critical; the order of the addition of the components remains the same.

Other adjuvants such as corrosion inhibitors, adhesion promoters, and the like, commonly added to asphalt coating compositions may be added to the compositions of this invention.

The following examples are provided to illustrate the preferred compositions, the preferred method of preparation, and comparative evaluations. In these examples all percentages are by weight based on the total weight of all components in the described compositions.

EXAMPLE 1

Preparation of diethylene glycol phosphate ester (DEG PE)

200 lb of diethylene glycol was charged to a 60 gallon stainless steel vessel jacketed for heating and cooling and equipped with a Cowles agitator. 400 lb of 115% polyphosphoric acid was added with cooling and agitation over a 3 hour period, keeping the temperature between 50° and 60° C. for the first 2 hours and allowing the temperature to rise to 78° C. at the end of 3 hours. The product was heated to 90° C. and held at 90°–94° C. for 2 hours. The resulting phosphate ester has a viscosity of 48,000 cps at 25° C. and a specific gravity of 1.66.

EXAMPLE 2

Preparation of asphalt compositions using a pregelling procedure 60 g of asphalt cutback (Trumbull 6036) was thoroughly mixed with 1.2 g of the N-tallow propylene diamine salt of C9-13 neocarboxylic acid (Surtech AS-109 from Surface Chemists of Florida, Inc.,) for about 1 minute with a spatula. 6 g of attapulgite clay (Attagel 36 from Engelhard Corporation) was added with thorough mixing for 1 minute. The remaining 33.9 g of cutback was added gradually with more stirring for 2 minutes. The resulting mixture was quite thin with a viscosity of approximately 3,100 cps. 0.3 g of the diethylene glycol phosphate ester of Example 1 was added followed by mixing. The final mixture becomes increasingly viscous as the enhancer is dispersed and reaches a maximum viscosity within 1 minute.

Asphalt compositions were prepared using method of Example 2 and the acid enhancers described in Table 1. The acids were added as water solutions at the concentrations noted. Viscosities were measured with a Brookfield Viscometer Model LVT with a helipath stand and T spindles (Brookfield Engineering, Stoughton, Mass.). The viscosity data presented in Table 1 were obtained using a "T-F" spindle.

TABLE 1

| Example | Acid | $Pk_a$ | Wt. % of Total Composition | Conc. of Acid | Maximum Viscosity (cps) |
|---|---|---|---|---|---|
| 3 | None | NA | 0 | NA | 3,100 |
| 4 | Hydrochloric acid | 0 | 0.14 | 31% | 228,000 |
| 5 | Sulfuric acid | 0 | 0.10 | 50% | 172,000 |
| 6 | Oxalic acid | 1.27 | 0.18 | 20% | 262,000 |
| 7 | Phosphoric acid | 2.15 | 0.09 | 85% | 593,000 |
| 8 | Citric acid | 3.13 | 0.12 | 50% | 212,000 |
| 9 | Glycolic acid | 3.83 | 0.21 | 70% | 130,000 |
| 10 | Acetic acid | 4.76 | 0.20 | 99% | 147,000 |
| 11 | Polyacrylic acid | 4.25 | 0.21 | 50% | 474,000 |
| 12 | Polymaleic acid | ~2 | 0.14 | 50% | 393,000 |
| 13 | Polyphosphoric acid | ~2 | 0.14 | 50% | 1,030,000 |
| 14 | 1-hydroxyethylidene diphosphonic acid | 1.2 | 0.20 | 60% | 550,000 |
| 15 | amino-tris(methylene-phosphonic acid | 1.2 | 0.22 | 50% | 562,000 |
| 16 | DEG PE (Example 1) | ~2 | 0.20 | 100% | 600,000 |
| 17 | 1:1 Polyacrylic acid: Phosphoric acid | — | 0.20 | 63% | 1,357,200 |
| 18 | 2-ethylhexyl phosphate | ~2 | 0.40 | 100% | 10,300 |

Very large increases in viscosity are obtained by the addition the acid enhancers to the compositions containing Surtech AS-109 and attapulgite clay. EXAMPLES 4 and 5 show less preferred compositions because the additions of hydrochloric acid and sulfuric acid may render the compositions corrosive. EXAMPLE 18, in which the acid is essentially water insoluble and thus less preferred did not produce an increase in viscosity of the magnitude of the more preferred compositions of the invention. The compositions described in Table 2 were prepared by the procedure of Example 2, using the asphalt cutback clay, surfactant, and acid enhancers indicated. Viscosities were measured with a Precision Cone Penetrometer (Precision Scientific Co., Chicago, Ill.) with a 10 gram, ⅝ inch diameter cone. A 4 oz plastic cup 2.5 inches in diameter and 1.75 inches in depth was filled nearly to the top with the asphalt composition immediately after its preparation. Special care was taken to remove all air voids from the sample. The cone tip was positioned exactly at the surface of the asphalt, then released for exactly 5 seconds, and the depth of the penetration was recorded. Measurements were done in triplicate, and the values reported are averages for the penetration in millimeters. Lower numbers indicate greater gel strength.

TABLE 2

| Example | Surfactant | Cutback | Clay | Enhancer | Cone penetration |
|---|---|---|---|---|---|
| 19 | 1.5% Arquad 2C-75 | Monsey | 8% Attagel 36 | 0.3% DEG PE | 9 mm |
| 20 (comparative) | 1.5% Arquad 2C-75 | Monsey | 8% Attagel 36 | None | >25 mm |
| 21 | 0.8% Redicote CG | Monsey | 8% Attagel 36 | 0.25% DEG PE | 7.3 mm |
| 22 (comparative) | 0.8% Redicote CG | Monsey | 8% Attagel 36 | None | >25 mm |
| 23 | 1.5% Arquad 2HT75 | Monsey | 8% Attagel 36 | 0.3% DEG PE | 9 mm |
| 24 (comparative) | 1.5% Arquad 2HT75 | Monsey | 8% Attagel 36 | None | >25 mm |
| 25 | 1.2% PA-14 Acetate | Trumbull 6036 | 6% Attagel 36 | 0.48% 3:1 poly acrylic acid: phosphoric acid | 64,000 cps[a] |
| 26 (comparative) | 1.2% PA-14 Acetate | Trumbull 6036 | 6% Attagel 36 | None | <10,000 cps[a] |
| 27 | 1.2% Igepal DM-430[b] | Trumbull 6036 | 6% Attagel 36 | 0.25% DEG-PE | 7800 cps[a] |
| 28 (comparative) | 1.2% Igepal DM-430[b] | Trumbull 6036 | 6% Attagel 36 | None | 6200 cps[a] |

[a]Brookfield viscosity
[b]Dinonyl phenol condensed with approximately 5 moles of ethylene oxide These examples demonstrate that the addition of acid enhancers increases the viscosity of asphalt compositions when cationic surfactants commonly used in these compositions have been added. When the nonionic surfactant Igepal DM-430 was used, the increase on the addition of the acid enhancer was not significant.

The following compositions were prepared using the procedure of Example 2:

EXAMPLE 29

94.3% Trumbull 6036 cutback
5.0% Bentonite (Slurry Ben 90, American Colloid Co., Arlington Heights, Ill.)
0.6% Surtech AS-109
0.2% DEG PE (Example 1)
The Brookfield viscosity was 15,000 cps. The viscosity before adding the DEG PE was 4700 cps.

EXAMPLE 30

88.25% Monsey cutback
10.0% Min-U-Gel FG
1.5% Surtech AS-109
0.25% DEG PE (Example 1)
The Brookfield viscosity as 530,000 cps. The viscosity before adding the DEG PE was less than 10,000 cps.

EXAMPLE 31

83.2% Gardner cutback
15.0% Kaolinite (Barnett Clay, Helca Mining)
1.5% Surtech AS-109
0.3% DEG PE (Example 1)
The Brookfield viscosity was 15,000 cps. The viscosity before adding the DEG PE was 3750 cps.

The invention can be embodied in other forms without departing from the spirit or essential attributes thereof. Particularly it will be appreciated by those skilled in the art that the compositions will be useful in many applications where a gelled consistency is desired in an essentially nonaqueous environment. Reference should therefore be had to the following claims, rather than to the foregoing specification to determine the scope of the invention.

The embodiments of the invention in which an exclusive property or privilege is claimed are defined as follows:

1. An organic coating composition comprising:

at least one asphalt cutback, at least one clay mineral, at least one cationic surfactant, and at least one polyfunctional acid with a $pK_A$ value less than about 5;

wherein said clay mineral is present at about 2 to about 25 percent by weight of said asphalt cutback, said cationic surfactant is present at about 5 to about 33 percent by weight of said clay mineral, and said acid is present at about 5 to about 50 percent by weight of said cationic surfactant; the weight ratio of clay mineral to acid is at least about 5 to 1, and the acid is present at a maximum level of about 1 percent by weight of the final composition.

2. The composition of claim 1 wherein said clay mineral is present at about 5 to about 25 percent by weight of the weight of said asphalt cutback, said cationic surfactant is present at about 8 to about 25% by weight of said clay mineral, and said acid is present at about 10 to about 33 percent by weight of the said cationic surfactant.

3. The composition of claim 2 wherein said clay mineral is an attapulgite clay.

4. The composition of claim 1 wherein said cationic surfactant is a salt of a surface active polyamine and a carboxylic acid, said polyamine having the structure:

$$\text{R}-\underset{|}{\overset{H}{N}}-(\text{A}-\underset{|}{\overset{H}{N}})_n-\text{H}$$

wherein R is chosen from the group consisting of (I) alkyl or alkenyl containing from about 10 to about 22 carbon atoms, and (ii) R'—O—CH2CH2CH2— wherein R' is alkyl containing from about 8 to about 22 carbon atoms; A is a divalent hydrocarbyl group containing about 2 to about 6 carbon atoms; and n is an integer from about 1 to about 3; and said carboxylic acid having the structure:

R"—COOH wherein R" is alkyl or alkenyl containing about 6 to about 28 carbon atoms.

5. The composition of claim 1 wherein said acid contains phosphorus.

6. The composition claim 1 wherein said acid is a phosphate ester of diethylene glycol.

7. A method for producing a thickened organic coating composition comprising the steps of 1. providing a quantity of asphalt cutback,
2. adding a cationic surfactant and mixing,
3. adding a clay mineral and mixing,
4. adding an additional quantity of asphalt cutback which is about 0 to about 100 percent by weight of the quantity in step 1, and mixing,
5. adding a polyfunctional acid with a $pK_A$ value less than about 5, and mixing.

8. The method of claim 7 wherein about 25 to about 100 percent by weight of the quantity of asphalt cutback added in said Step 1 is added in said Step 4.

9. The method of claim 7 wherein all of asphalt cutback is added in said Step 1.

* * * * *